United States Patent [19]
Waller

[11] Patent Number: 5,256,348
[45] Date of Patent: Oct. 26, 1993

[54] TIRE SHAPING PRESSURE CONTROL SYSTEM AND METHOD

[76] Inventor: Michael V. Waller, 2 Heritage Trace, Newnan, Ga. 30263

[21] Appl. No.: 714,686

[22] Filed: Jun. 13, 1991

[51] Int. Cl.$^5$ ............................................. B29C 35/04
[52] U.S. Cl. ................................. 264/40.5; 264/315; 264/326; 425/29; 425/32; 425/38; 425/149
[58] Field of Search ................. 264/40.1, 40.5, 40.3, 264/315, 326; 156/132; 425/33, 38, 143, 149, 29, 32

[56] References Cited

U.S. PATENT DOCUMENTS

| | | | |
|---|---|---|---|
| 3,443,280 | 5/1969 | Hugger | 425/29 |
| 3,836,614 | 9/1974 | Neugroschl | 264/40.1 |
| 4,302,274 | 11/1981 | Enders | 156/132 |
| 4,382,052 | 5/1983 | Arimatsu | 264/326 |
| 4,422,987 | 12/1983 | Arimatsu | 264/40.3 |
| 4,502,857 | 3/1985 | Hinks | 425/33 |
| 4,744,931 | 5/1988 | Trapp | 264/40.5 |
| 4,779,206 | 10/1988 | Mattson et al. | 264/40.1 |

FOREIGN PATENT DOCUMENTS 467835  5/1975  U.S.S.R. ............................. 425/143

Primary Examiner—Jeffery Thurlow
Assistant Examiner—Mathieu Vargot
Attorney, Agent, or Firm—B. J. Powell

[57] ABSTRACT

A system for controlling the shaping fluid pressure in tire bladders in a tire molding press which senses the fluid pressure in the bladder used to shape the tire being loaded into the tire press; compares the sensed fluid pressure in the bladder with the desired set point fluid pressure to be maintained in the bladder; and adjusts the fluid pressure in the bladder in response to the compared pressures to cause the fluid pressure in the bladder to be maintained at the desired set point fluid pressure.

13 Claims, 4 Drawing Sheets

TIRE SHAPING PRESSURE CONTROL SYSTEM AND METHOD

BACKGROUND OF THE INVENTION

This invention relates generally to the control of pneumatic tire fabrication and more particularly to the control of the bladder shaping pressure in a pneumatic tire molding press.

While pneumatic tires are being loaded into a tire molding press and while they are being molded in the press, the tire is internally supported on an inflatable bladder. The control of the fluid pressure in the bladder is particularly critical while the tire is being loaded into the tire press and the tire press is closing onto the tire (this is commonly called the shaping pressure).

Heretofore, the shaping pressure has been controlled by manually adjusted pressure regulators that theoretically set each shaping pressure to which the tire is to be subjected during loading. Typically, two such shaping pressures are used, a "hold shape" pressure that holds the tire in position while the loaders are being retracted and a "first shape" pressure that holds the tire in position while the tire mold is being closed onto the tire. Once the tire mold is closed, a different set of pressures and operating conditions are applied while the tire is being cured. One of the problems associated with such prior art control schema is that a separate pressure regulator is usually required for each pressure selected. Moreover, adjustments in the particular pressure settings to compensate for different conditions such as high temperature, a delay causing the press to remain open too long, a delay in the loading of the tire mold, or a new bladder being installed on the tire mold, was difficult to achieve without elaborate valve and relay systems. This caused such prior art control systems to be difficult to set up and operate and to be costly. Further, the ability of such manually adjusted pressure regulator to maintain substantially constant pressure setting is limited due partly to the response time in making corrections and due to the accuracy of the pressure regulators themselves. As a result, difficulties have been encountered with the use of such prior art systems. One difficulty is an unacceptably high scrap loss due to improperly made tires and another difficulty is lower production yields in the operation of the tire molding presses.

SUMMARY OF THE INVENTION

These and other problems and disadvantages associated with the prior art are overcome by the invention disclosed herein by providing a control system which controls the shaping pressure in the molding press bladder using one pressure regulator and which can easily accommodate the various adjustments that need to be made for varying external conditions. The system of the invention is designed to operate a pneumatically controlled pressure regulator valve and is a stand-alone, microprocessor based pressure control system, designed to accurately and repeatably control the various shaping pressures required in the manufacture of vehicular tires.

The system is chiefly comprised of a microprocessor, cavity pressure sensors, precision current-to-pressure transducers, keypad/display units, and power supplies. The system electrically monitors the cavity pressure within the bladder used to shape a new tire via the "desired" pressure for the current step of the shaping cycle and the microprocessor computes an appropriate signal for output to the current-to-pressure transducer. The current-to-pressure transducer produces a resultant pneumatic output to operate the regulator valve which will admit the shaping gas to the tire bladder. In addition to the pressure monitoring and control, the microprocessor also monitors logic inputs to determine the appropriate time at which to increase or decrease shaping pressures and stores the necessary "setpoint" data used in these steps. Digital displays are used to visually monitor the cavity pressure as detected by the attached sensor.

Sensor placement, control loop accuracy and speed of operation result in reduced scrap or blemished tires and a reduction in the cycle time for making each tire. The microprocessor is programmed to receive the inputs indicative of the state of the external conditions at the tire press as well as the pressure sensed within the bladder itself and uses these inputs to control the pneumatic transducer that changes the pressure regulating control air to the pressure regulator valve. The bladder pressure is sensed and corrected rapidly so that the desired bladder pressure is maintained for each operation.

The method of the invention includes controlling the shaping fluid pressure in the bladder supporting the tire in a tire press which comprises the steps of sensing the fluid pressure in the bladder used to shape the tire being loaded into the tire press, comparing the sensed fluid pressure in the bladder with the desired setpoint fluid pressure to be maintained, and adjusting the fluid pressure in the bladder until the bladder fluid pressure reaches the desired setpoint fluid pressure to be maintained. The method also includes the step of changing the desired setpoint fluid pressure to accommodate the different operations within the loading of the tire press. The method also comprises the step of adjusting the desired setpoint fluid pressure to compensate for changes in external conditions such as high temperature, the tire press remaining open too long between loadings or a new bladder being installed.

These and other features and advantages of the invention will become more clearly understood upon consideration of the following detailed description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

The invention is designed to be used with a conventional tire molding press (not shown) in which the uncured tire is loaded into the press with a loader. Usually such presses mold two tires at once and the loaders load both tires at once. Each of the tires is then supported on an inflatable bladder to allow the loader to retract and the tire press to close onto the uncured tire. The bladder continues to support the tire during curing and until the unloaders remove the cured tire from the mold. The molding press has its own control system that controls the basic press operation. The system 10 of the invention is activated by the molding press control system and controls the bladder pressure during the loading of the tire in the molding press.

Figure 1:
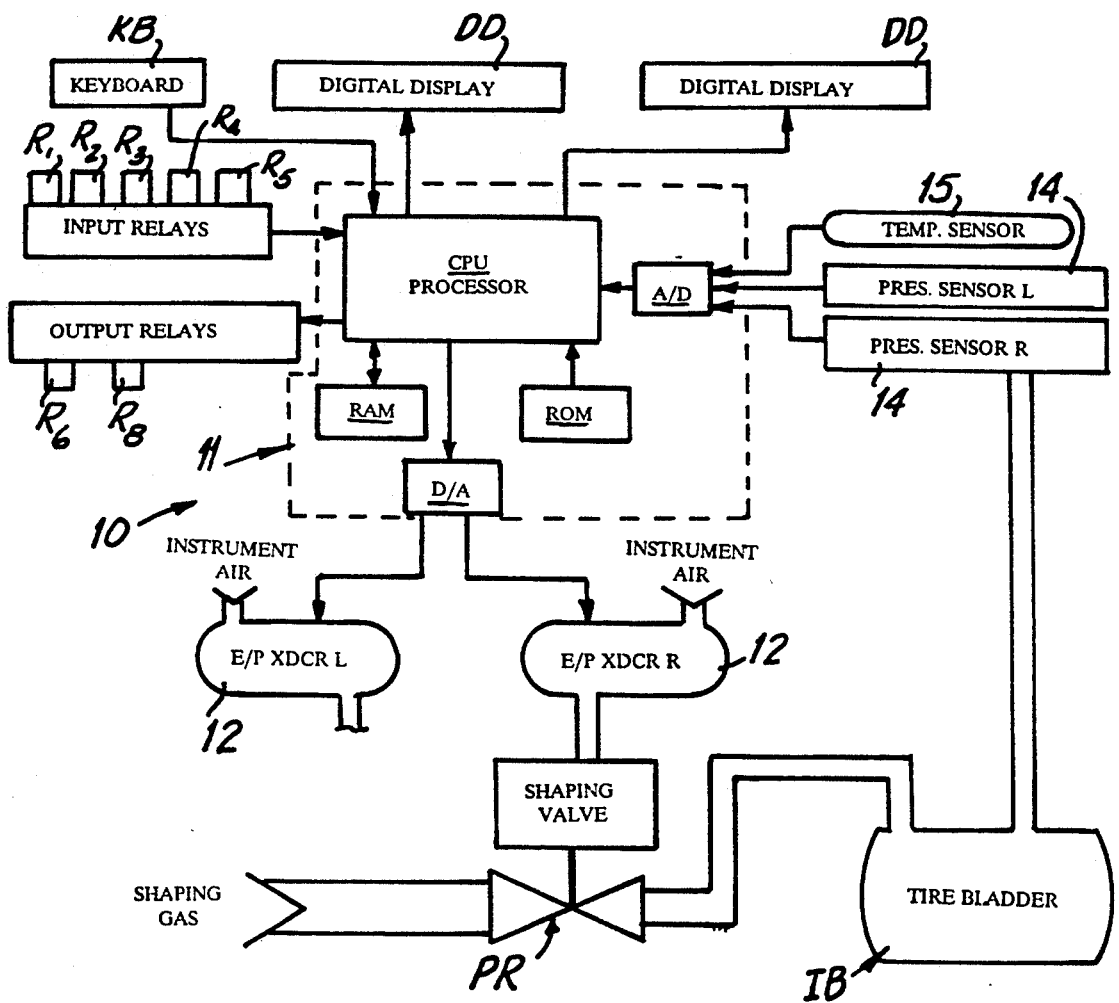
FIG. 1 is schematic drawing illustrating the various components of the system of the invention.

Referring to FIG. 1, the system 10 includes a microprocessor 11 that controls a pneumatic controller 12 which in turn controls the pneumatic reducing valve serving as the pressure regulator PR for each of the inflatable bladders IB in the tire molding press. A different pressure sensor 14 is in direct fluid communication with each bladder IB to provide a sensed pressure input to the microprocessor indicative of the actual fluid pressure in the bladder. Only one bladder IB is shown in FIG. 1 for sake of simplicity. Additionally, a temperature sensor 15 inputs the ambient temperature at the press to the microprocessor 11. The shaping air is supplied to the pressure regulator PR through a solenoid supply valve on the molding press that is controlled by the press control circuitry to alternatively supply shaping air or steam to the inflatable bladder in the molding press. The shaping air is used during shaping of the tire while the steam is used during the curing of the tire.

External inputs to the system 10 are also provided by the molding press control circuitry which includes: the loader "in" relay $R_1$ that is activated when the loaders have loaded the uncured tires to the loaded position in the press molding cavities; the "press closing" relay $R_2$ that is activated during the closing of the press after the loaders are retracted out of the molding cavity; the press "closed" relay $R_3$ which is activated while the molding press is closed; the "new bladder" relay $R_4$ activated after new bladders IB; and, the "delay cure" relay $R_5$ which is activated if the press is left open too long. External outputs from the system 10 to the press control circuitry are provided to the "release loaders" relay $R_6$ and to the "loader lockout" relay $R_8$ as will become apparent.

The microprocessor 11 includes a central processing unit CPU whose basic control software is provided by a read only memory ROM and which keeps the operational data in the random access memory RAM. The analog inputs from the pressure and temperature sensors 14 and 15 is digitized through an analog-to-digital converter A/D for the processing unit CPU. The digital outputs from the processing unit CPU are converted to analog for the pneumatic controllers 12 through a digital-to-analog converter D/A. The data is inputted into the memory RAM from a keyboard KB and the values being sensed can be displayed in digital displays DD. The keyboard KB and the displays DD may be housed in a separate hand held unit. The pneumatic controllers 12 illustrated are electric-to-pneumatic transducers. One such transducer is disclosed in U.S. Pat. No. 4,777,383 whose description is incorporated herein by reference. The pressure regulators PR are pressure reducing valves whose outlet pressure is set by a control pressure input to the valve. Such valves are commercially available from Leslie Controls, Inc. of Tampa, Fla. as their Class GPK or GPB pressure reducing valves.

OPERATION

Typical tire molding press operation requires the bladders IB to be inflated to a "Hold Shape" pressure to keep the uncured tires in position while the loaders are being retracted and the press starts to close. It is then necessary to increase the pressure in the bladders to a "First Shape" pressure to insure that the uncured tire seats properly in the mold cavities. The "Hold Shape" pressure and the "First Shape" pressure are known as the "shaping" pressures. The "Hold Shape" pressure and "First Shape" pressure are typically different for different types and sizes of tires. The different pressure setpoints are typically inputted by the keyboard KB when each different type or size of tire is to be cured in the molding press.

The operation of the system 10 is automatic and is activated by the tire molding press control circuitry. The system 10 electrically monitors the cavity pressure within the bladders IB used to shape a new tire, and the microprocessor 11 compares the actual bladder pressure with the preset pressure for the current step of the shaping cycle and computes an appropriate signal for output to the current-to-pressure transducer 12. The current-to-pressure transducer 12 produces a resultant pneumatic output to operate the regulator PR which will admit the shaping gas to the tire bladder IB. In addition to the pressure monitoring and control, the microprocessor 11 also monitors logic inputs to determine the appropriate time at which to increase or decrease shaping pressures and stores the necessary "setpoint" data used in these steps. Digital displays DD are used to visually monitor the bladder cavity pressure as detected by the attached sensor 14.

The automatic control sequence for shaping a tire roughly follows this sequence:

A. Uncured tires loaded into the mold cavities to start the tire shaping cycle;
B. Inflation air is applied and the system 10 inflates the bladders IB into the uncured tires to an initial "inflate" pressure sufficient to expand the bladders out into the tires (typically approximately 2 psi);
C. The bladders are then deflated to a lower "deflate" pressure to allow any wrinkles or folds in the bladder to straighten out (usually roughly 1 psi);
D. The bladders are then reinflated to the "Hold Shape" pressure to hold the tires in place while the loaders are retracted;
E. When the bladders have reached the desired "Hold Shape" pressure, the loaders are released allowing them to retract;
F. When the loaders are fully retracted, the press control circuitry proceeds with the closing of the press;
G. When the press breaks over during the closing operation, it activates the "First Shape" relay to cause the system 10 to inflate the bladders IB to the "First Shape" pressure; and,
H. The system 10 maintains the bladders IB at "First Shape" pressure until the press fully closes to turn off the shaping air and cause the system 10 to go into a standby mode and wait for the start of a new cycle.

If a new bladder IB has been installed and the "new bladder" button on the press has been pushed to activate the "new bladder" relay $R_4$, the operation of the press is the same as described above with the following exceptions. The shaping pressures are automatically increased a preset amount for the next ten cycles to overcome the stiffness of the new bladder. Typically, the pressure are increased about 2 psi. After the tenth tire has been cured, the system 10 reverts to its normal operation.

If the press stands open for more than a predetermined amount of time or the operator pushes the "delay cure" button on the press, the "delay cure" function will also increase the shaping pressures a preset amount for that one cycle. Typically, the pressures are increased about 2 psi. After one cycle the system 10 reverts to normal operation.

The system temperature sensor 15 constantly monitors the ambient air temperature at the press. If the ambient air temperature rises above a preset value the "summer shaping" function will be engaged and the "First Shape" pressure will be decreased a prescribed amount to compensate for the softer uncured tires at the higher temperature. Typically, the "First Shape" pressure is decreased about 1 psi.

To prevent tampering or erroneously changing the data used by the system 10, the preset values for any of the above functions are accessible only through an appropriate access code entered through the keyboard KB, usually incorporated in a hand held keypad/display unit. Once access has been obtained, the values may be changed to match the desired operation parameters.

Figure 2A:
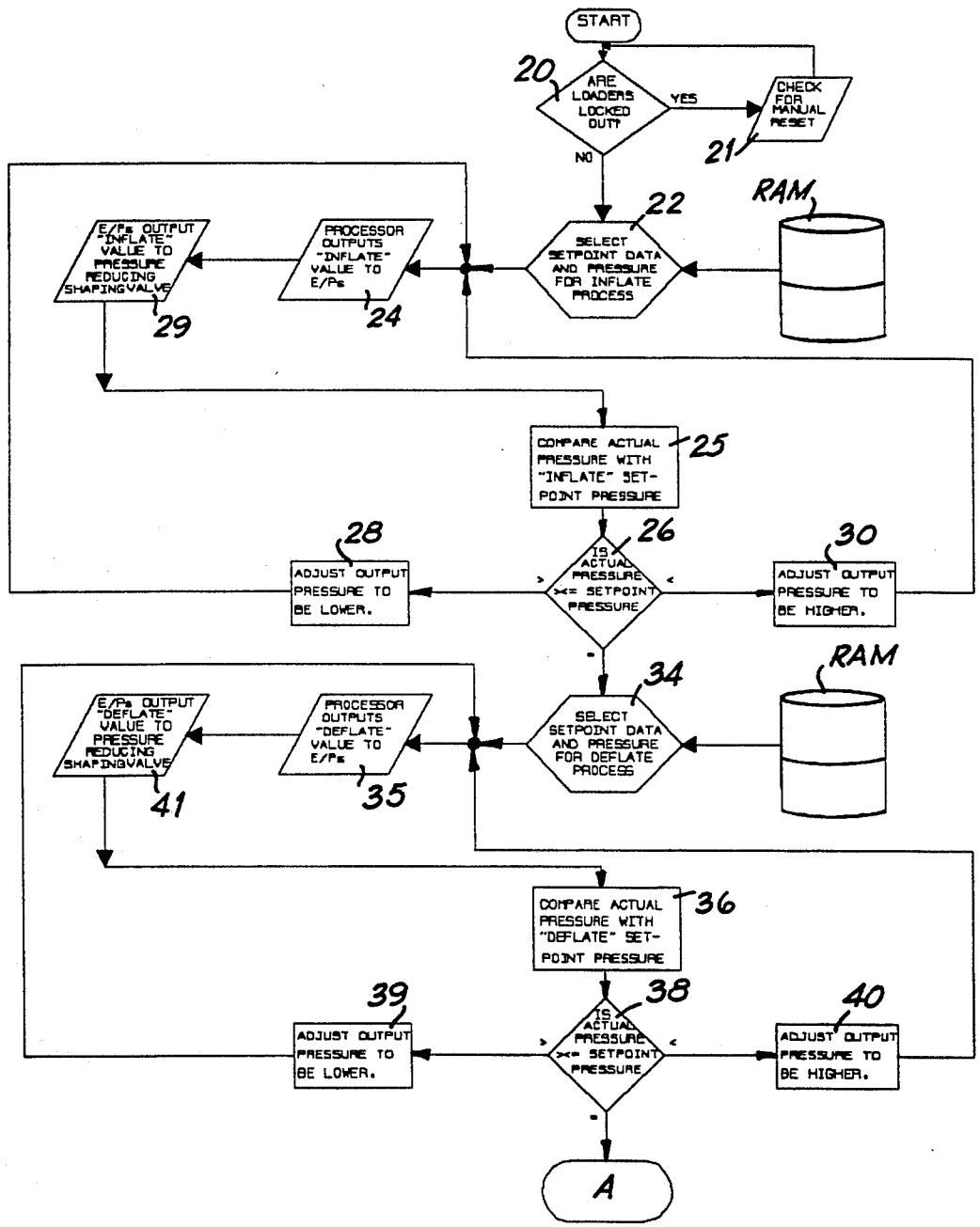
FIGS. 2A-2C are flow diagrams illustrating the operation of the invention.
Figure 2B:
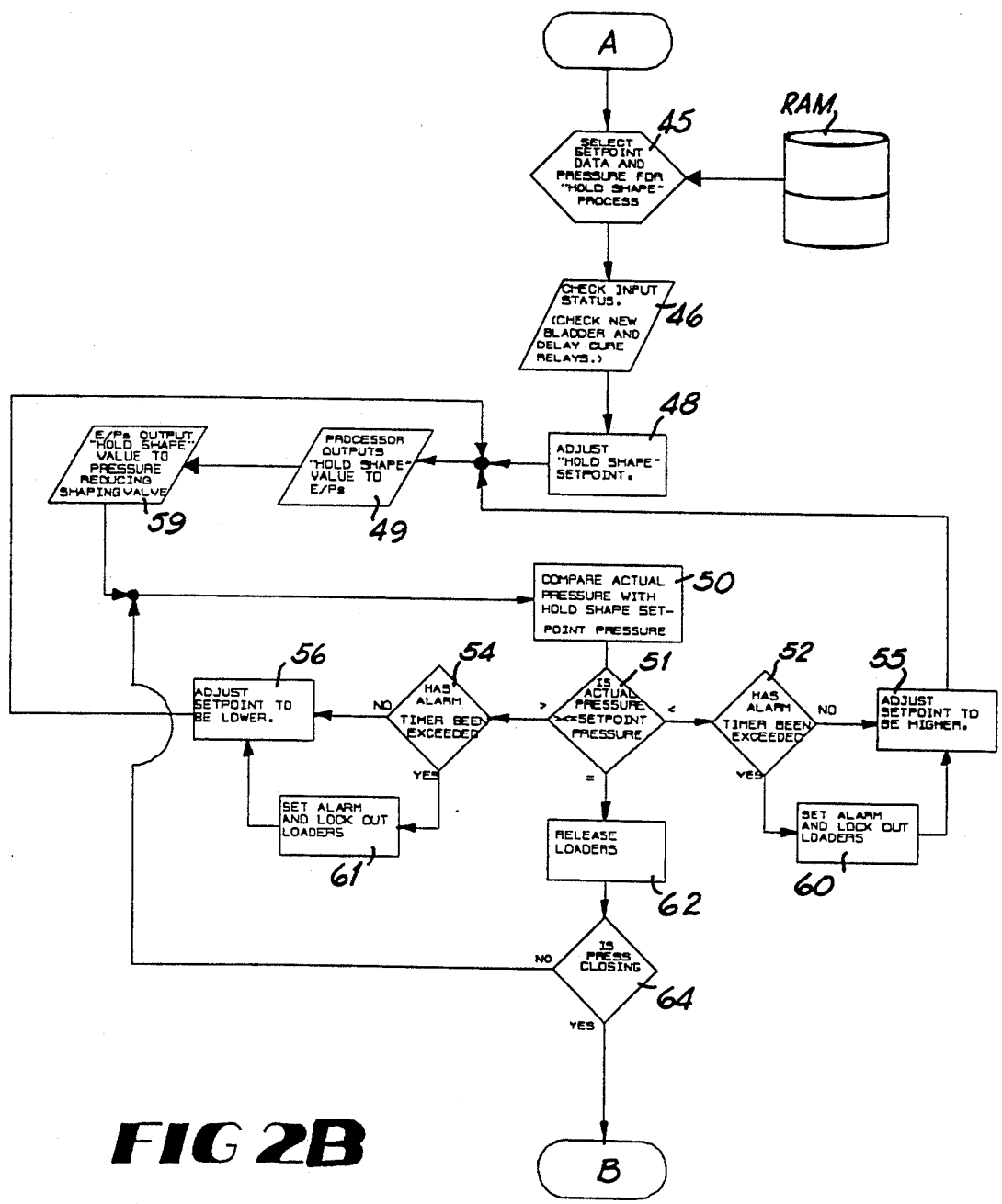
Figure 2C:
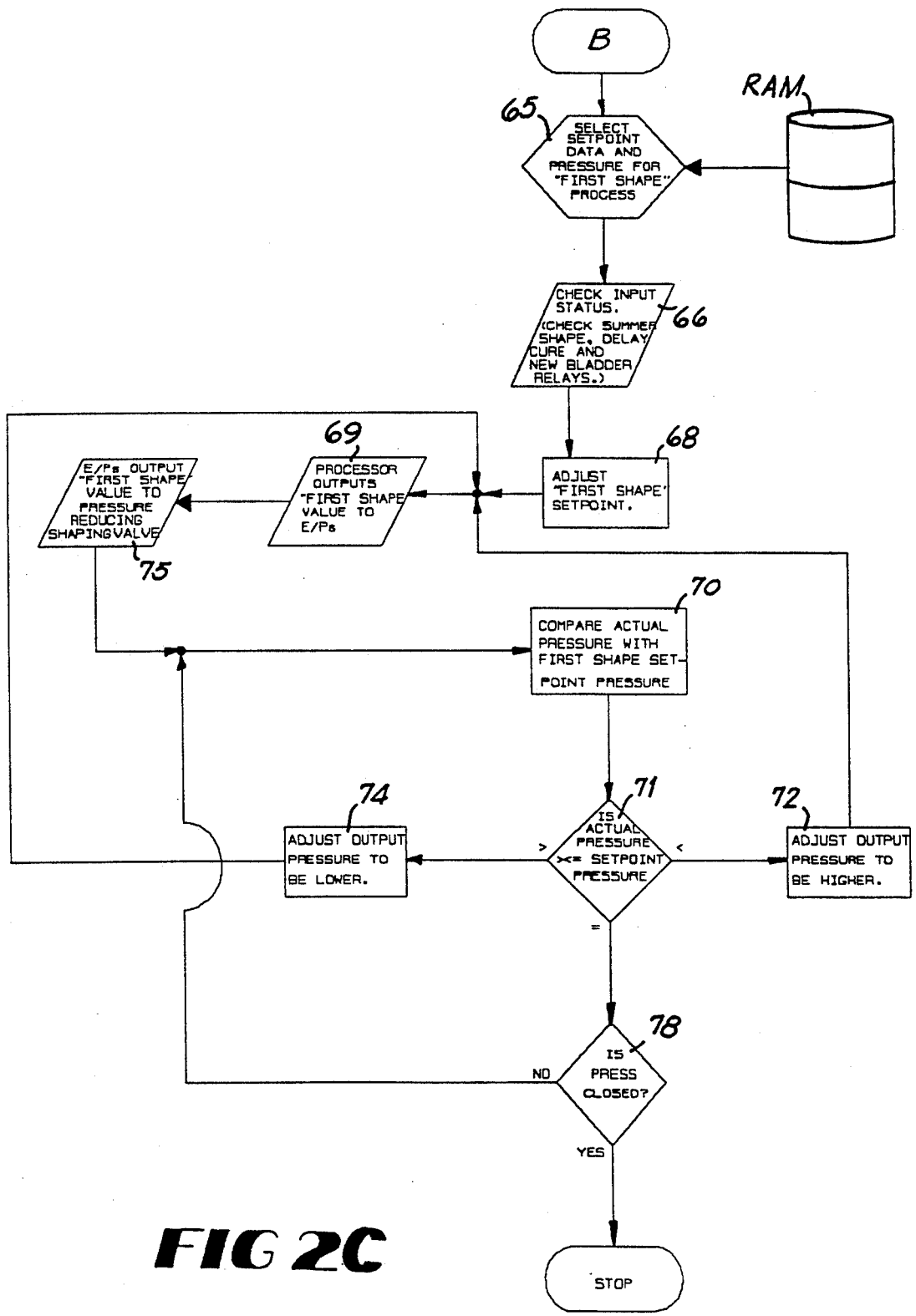

This specific operation of the system 10 will best be understood by reference to the flow diagram seen in FIGS. 2A-2C.

The operator first loads two uncured tires onto the loaders and activates the press control circuitry. The loaders move in and down into the cavities in the molding press until the interior of the tires are in registration with the fully deflated bladders IB. At this time, the loaders contact switches that activate the solenoid valve to supply shaping gas to the pressure regulator PR and also activate the loaders "in" relay $R_1$ to activate the system 10.

First of all, the system 10 checks to see if the loaders are locked out (block 20) to prevent activation of the bladders if the tires are not in position. If the loaders are out, the system 10 checks to see if the manual reset button has been closed to reset the machine (block 21) and continues to cycle until the machine is reset. If the loaders are not out, the system 10 selects the "inflate" data from the random access memory RAM (block 22) and outputs this data to the pneumatic controllers 12 (block 24). Each of the pneumatic controllers 12 then sets the pressure output of the pressure regulators PR (block 29).

It will be appreciated that the bladders IB are individually controlled with the system 10. The control of only one bladder is shown for sake of simplicity.

After the pneumatic controllers 12 have set the pressure regulators PR, the system 10 compares the actual pressure detected by the pressure sensor 14 connected to the air bladder IB with the desired setpoint value in the system (block 25). The system 10 then decides whether the actual pressure is less than, equal to, or greater than the setpoint pressure (block 26). If the actual pressure is less than the setpoint pressure, the system 10 adjusts the "inflate" value upwardly (block 30) and outputs this adjusted value to the pneumatic controller 12 (block 24). If the compared actual pressure is greater than the desired setpoint pressure, the system 10 adjusts the "inflate" value downwardly (block 28) and then outputs this adjusted setpoint pressure to the pneumatic controller 12 (block 29). The system 10 then continues to recycle through the comparison block 25 and the decision block 26 until the actual pressure in the bladder IB is equal to the desired setpoint value.

When the "inflate" setpoint value is reached, the system selects the "deflate" data (block 34) from the memory RAM and outputs this information to the pneumatic controllers 12 (block 35). The pneumatic controllers 12 outputs the pneumatic control pressure to the pressure regulators PR (block 41). The system 10 again compares the actual pressure from pressure sensor 14 with the setpoint data (block 36) and decides whether the actual pressure is less than, equal to, or greater than the setpoint value (block 38). If the compared pressure is not equal to the setpoint, the system 10 adjusts the "deflate" set point value (block 39 and 40) and then outputs this adjusted value to the pneumatic controller 12 (block 35).

When the actual pressure sensed by the pressure sensor 14 is equal to the selected "deflate" setpoint, system 10 shifts into the "hold shape" mode. The system 10 then selects the appropriate "hold shape" data (block 45) from the memory RAM. The system 10 then checks the status of the adjustment inputs from the "new bladder" relay $R_4$ or the "delay cure" relay $R_5$ to see if they are activated (block 46). If one of the relays is activated, the system 10 adjusts the "hold shape" setpoint (block 48) before outputting the "hold shape" setpoint to the pneumatic controllers 12 (block 49) to cause the pneumatic controllers 12 to set the pressure regulators PR (block 59). The system 10 then compares the actual pressure sensed by the pressure sensor 14 with the setpoint pressure (block 50) and determines whether the actual value is greater than, equal to, or less than the setpoint data (block 51). If the compared values are not equal, the system 10 makes the appropriate adjustment to this setpoint value (blocks 55 and 56) and outputs the adjusted value (block 49) to the pneumatic controller 12.

When the compared actual pressure is equal to the setpoint pressure deadband, the system 10 releases the loaders (block 62) allowing the loaders to release the tires and move out of the press with the tires being supported solely on the air bladders IB. After the loaders release, the system 10 continues to compare actual pressure sensed by the pressure sensor 14 with the setpoint pressure (block 50). If the sensed pressure exceeds the setpoint pressure deadband for longer than the alarm time limit, the system 10 sets the alarm and locks out the loaders to prevent reloading until the system has been checked by maintenance personnel.

The system 10 determines if the "press closing" relay $R_2$ has been activated (block 64). The system 10 continues to run through the comparison loop of the blocks 50, 51 and 62 until the "press closing" relay is activated.

When the "press closing" relay is activated, the system 10 selects the "first shape" data (block 65) from the memory RAM. The system 10 then checks the adjustment inputs (block 66) to see if the "new bladder" relay $R_4$ or the "delay cure" relay $R_5$ has been activated or that the temperature sensor 15 is above the prescribed threshold value to activate the "summer shape" mode. The system 10 then makes the appropriate adjustment to the selected setpoint (block 68) and outputs this adjusted setpoint to the pneumatic controllers 12 (block 69) which set the pressure regulators PR (block 75).

The system 10 then compares the actual pressure sensed by the pressure sensor 14 with the desired setpoint (block 70). If the compared pressures are not equal (block 71), the system 10 adjusts the setpoint (blocks 72 and 74) and outputs this adjusted setpoint (block 69) to the pneumatic controller 12. The system 10 continues to compare the actual bladder pressure with the setpoint pressure until the setpoint pressure is achieved whereupon the system 10 checks to see if the press has fully closed to close the "press closed" relay R₃ (block 78). The system 10 continues to recycle through the comparison loop (blocks 70, 71 and 78) until the "press closed" relay is activated to indicate that the press is closed to switch to the curing air whereupon the sequence in the system 10 is stopped.

What is claimed as invention is:

1. A method of adjusting the shaping fluid pressure in the molding press bladder of a tire press to a desired set point fluid pressure value as an uncured tire is being loaded into the tire press for shaping in preparation for curing using a pressure regulator controlled by a pneumatic controller and connecting a source of shaping fluid under pressure to the interior of the bladder comprising the steps of:

A. generating a first input to the pneumatic controller controlling the pressure regulator so that the pressure output of the pressure regulator is at a first selected output value;
   B. sensing the shaping fluid pressure in the interior of the bladder used to shape the tire while being loaded into the tire press;
   C. comparing the sensed shaping fluid pressure in the bladder with the desired set point fluid pressure value to be maintained in the bladder to determine the compared difference between the sensed fluid pressure and the set point fluid pressure value;
   D. adjusting the input to the pneumatic controller in response to said compared difference to adjust the output of the pressure regulator to an adjusted selected output value which is greater than said first selected output value if the sensed shaping fluid pressure in the bladder is less than said desired set point fluid pressure value and which is less than said first selected output value if the sensed shaping fluid pressure in the bladder is greater than said desired set point fluid pressure value;
   E. repeating steps B-D until the desired set point fluid pressure value is achieved in the bladder and to cause the fluid pressure in the bladder to be maintained at the desired set point fluid pressure value; and,
   F. changing the desired set point fluid pressure value to cause the bladder to be first inflated to a prescribed "inflate" pressure value to expand the bladder into the tire, then to be deflated to a prescribed "deflate" pressure value to cause the bladder to be deflated sufficiently to remove any folds therein, then to be reinflated to a prescribed "hold shape" pressure value while the tire loaders release the tire in the press, and finally to be inflated to a prescribed "first shape" pressure value while the tire press is being closed onto the tire being supported on the bladder.

2. The method of claim 1 further comprising the step of:

G. adjusting the desired set point fluid pressure value to compensate for changes in a prescribed external condition.

3. The method of claim 1 further comprising the steps of:

G) determining the status of an external condition; and
   H) adjusting the set point fluid pressure value selected in step A) by a predetermined amount to compensate for the external condition prior to step B) so that the pressure output value of the pressure regulator is adjusted to compensate for the external condition.

4. The method of claim 3 where the external condition is a new bladder having been installed in the molding press and wherein step H) further comprises increasing the pressure set point value by a prescribed "new bladder" amount for a prescribed number of cycles.

5. The method of claim 3 where the external condition is the press having been open longer that a prescribed period of time and wherein step H) further comprises increasing the pressure set point value by a prescribed "delay cure" amount for one cycle of operation.

6. The method of claim 4 where a second external condition is the press having been open longer than a prescribed period of time and wherein step H) further comprises increasing the pressure set point value by a prescribed "delay cure" amount for one cycle of operation in addition to said prescribed "new bladder" amount.

7. The method of claim 3 where the external condition is the ambient temperature at the press being higher than a prescribed value and wherein step H) further comprises decreasing the pressure set point value by a prescribed "summer shape" amount as long as the ambient temperature remains higher than the prescribed value.

8. The method of claim 6 where a third external condition is the ambient temperature at the press being higher than a prescribed value and wherein step H) further comprises decreasing the pressure set point value by a prescribed "summer shape" amount.

9. A system for controlling the shaping fluid pressure within the interior of inflatable tire supporting bladders in a tire press supplied from a pressurized fluid source comprising:

pressure sensing means for sensing the fluid pressure within the interior the tire support bladder;
   a pneumatically operated pressure regulator operatively connected to the pressurized fluid source and having a regulated output to the interior of the tire support bladder;
   an electric-to-pneumatic controller operatively connected to said pressure regulator and having a pneumatic output controlling said regulated output of said pressure regulator; and
   microprocessor means for repeatedly comparing the sensed fluid pressure in the tire support bladder with a prescribed set point fluid pressure value to be maintained in the interior of the tire support bladder and for adjusting said pneumatic output from said electric-to-pneumatic controller in response to the compared difference between the sensed fluid pressure and said prescribed set point fluid pressure value until the sensed pressure within the interior of the tire support bladder is substantially equal to and maintained at the prescribed set point fluid pressure, and for changing the desired set point fluid pressure value to cause the bladder to be first inflated to a prescribed "inflate" pressure value to expand the bladder into the tire, then to be deflated to a prescribed "deflate" pressure value to cause the bladder to be deflated sufficiently to remove any folds therein, then to be reinflated to a prescribed "hold shape" pressure value while the tire loaders release the tire in the press, and finally to be inflated to a prescribed "first shape" pressure value while the tire press is being closed onto the tire being supported on the bladder.

10. The system of claim 9 wherein said microprocessor further includes:
   data storage means for storing a plurality of prescribed set point fluid pressure values; and,
   selection means for selecting one of said stored plurality of prescribed set point pressure values for comparison with said sensed fluid pressure.

11. The system of claim 10 wherein said microprocessor further includes:
   compensation means for adjusting the set point fluid pressure value to be used for comparison with the sensed pressure to compensate for a prescribed external condition.

12. The system of claim 9 wherein said microprocessor further includes:
   data storage means for storing at least one prescribed set point fluid pressure value for comparison with said sensed fluid pressure.

13. The system of claim 12 wherein said microprocessor further includes:
   compensation means for adjusting the set point fluid pressure value to be used for comparison with the sensed pressure to compensate for a prescribed external condition.

* * * * *